(12) United States Patent
Affronti et al.

(10) Patent No.: US 8,631,079 B2
(45) Date of Patent: Jan. 14, 2014

(54) DISPLAYING A LIST OF FILE ATTACHMENTS ASSOCIATED WITH A MESSAGE THREAD

(75) Inventors: Michael Anthony Affronti, Seattle, WA (US); Andrew Russell Brauninger, Seattle, WA (US); James J. Edelen, IV, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 696 days.

(21) Appl. No.: 12/142,851

(22) Filed: Jun. 20, 2008

(65) Prior Publication Data

US 2009/0319618 A1 Dec. 24, 2009

(51) Int. Cl.
*G06F 15/16* (2006.01)

(52) U.S. Cl.
USPC .......................... 709/206; 709/205; 709/207

(58) Field of Classification Search
None
See application file for complete search history.

(56) References Cited

U.S. PATENT DOCUMENTS

| | | | |
|---|---|---|---|
| 5,604,862 A * | 2/1997 | Midgely et al. | 714/6.1 |
| 5,671,428 A * | 9/1997 | Muranaga et al. | 715/751 |
| 6,324,581 B1 * | 11/2001 | Xu et al. | 709/229 |
| 6,347,316 B1 * | 2/2002 | Redpath | 1/1 |
| 6,377,958 B1 * | 4/2002 | Orcutt | 707/690 |
| 6,411,924 B1 * | 6/2002 | de Hita et al. | 704/9 |
| 6,909,805 B2 * | 6/2005 | Ma et al. | 382/170 |
| 6,915,333 B2 | 7/2005 | Delia et al. | |
| 7,209,953 B2 | 4/2007 | Brooks | |
| 7,243,298 B2 | 7/2007 | Yozell-Epstein et al. | |
| 7,251,680 B2 | 7/2007 | DeVos | |
| 7,870,144 B2 * | 1/2011 | Demsky et al. | 707/756 |
| 2003/0041112 A1 | 2/2003 | Tada et al. | |
| 2003/0050933 A1 * | 3/2003 | DeSalvo | 707/102 |
| 2003/0055902 A1 * | 3/2003 | Amir et al. | 709/206 |
| 2003/0074394 A1 * | 4/2003 | Eshghi | 709/203 |
| 2003/0097421 A1 * | 5/2003 | Wille et al. | 709/217 |
| 2003/0135565 A1 * | 7/2003 | Estrada | 709/206 |
| 2003/0172119 A1 * | 9/2003 | Hosali et al. | 709/206 |
| 2003/0236750 A1 * | 12/2003 | Suermondt et al. | 705/50 |
| 2004/0064733 A1 | 4/2004 | Gong | |
| 2004/0212826 A1 * | 10/2004 | Kashiwazaki | 358/1.15 |

(Continued)

FOREIGN PATENT DOCUMENTS

CN   1987912 A   6/2007
JP   05081096 A * 4/1993 ............ G06F 12/00

(Continued)

OTHER PUBLICATIONS

Tang, et al., "Recent Shortcuts: Using Recent Interactions to Support Shared Activities", Conference on Human Factors in Computing Systems, Proceedings of the SIGCHI Conference on Human Factors in Computing Systems, ACM, 2007, pp. 1263-1272.
Tofel, "Xobni Outlook Add-on", PC World, Jun. 4, 2008, retrieved at <<http://www.pcworld.com/article/id,146040-c,outlookoutlookexpress/article.html>> p. 2.

(Continued)

*Primary Examiner* — Ian N Moore
*Assistant Examiner* — Dung B Huynh
(74) *Attorney, Agent, or Firm* — Hope Baldauff, LLC

(57) ABSTRACT

Technologies are described herein for displaying a list of file attachments associated with a message thread an email application. The messages associated with the message thread are identified, along with any file attachments attached to those messages. An aggregated attachment list is generated containing an entry for each file attachment associated with the message thread. The aggregated attachment list associated with the message thread is then displayed in a window of the email application.

15 Claims, 6 Drawing Sheets

(56) References Cited

U.S. PATENT DOCUMENTS

| | | | | |
|---|---|---|---|---|
| 2004/0221012 | A1* | 11/2004 | Heumesser | 709/206 |
| 2004/0255247 | A1* | 12/2004 | Demsky et al. | 715/530 |
| 2005/0076082 | A1* | 4/2005 | Le Pennec et al. | 709/206 |
| 2006/0036696 | A1 | 2/2006 | Maresh | |
| 2006/0075046 | A1* | 4/2006 | Yozell-Epstein et al. | 709/206 |
| 2006/0168543 | A1* | 7/2006 | Zaner-Godsey et al. | 715/835 |
| 2007/0061401 | A1 | 3/2007 | Bodin et al. | |
| 2007/0100991 | A1 | 5/2007 | Daniels et al. | |
| 2007/0139701 | A1* | 6/2007 | Nomura | 358/1.15 |
| 2007/0143425 | A1* | 6/2007 | Kieselbach et al. | 709/206 |
| 2007/0174394 | A1* | 7/2007 | Jayaweera | 709/206 |
| 2008/0046518 | A1* | 2/2008 | Tonnison et al. | 709/206 |
| 2008/0162651 | A1* | 7/2008 | Madnani | 709/206 |
| 2009/0013009 | A1* | 1/2009 | Nakayama | 707/203 |
| 2009/0205037 | A1* | 8/2009 | Asakura | 726/10 |

FOREIGN PATENT DOCUMENTS

| | | |
|---|---|---|
| JP | 2002-183058 A | 6/2002 |
| JP | 2006-107490 A | 4/2006 |
| KR | 10-2005-0038055 | 4/2005 |
| KR | 10-2005-0101050 | 10/2005 |

OTHER PUBLICATIONS

International Search Report dated Jan. 26, 2010 in International Application No. PCT/2009/044542.
Nguyen, "Current State and Future Development of Email," retrieved Mar. 3, 2008, at <<http://www.ischool.utexas.edu/~i385q/archive/nguyen_final.pdf>>, 19 pages.
Chinese Official Action dated Nov. 5, 2012 in Chinese Application No. 200980123542.5.
European Search Report dated Jan. 30, 2013 in European Application No. 09767235.6.
Russian Official Action dated Feb. 8, 2013 in Russian Application No. 2010151967/08(075133).
Japanese Official Action dated Mar. 5, 2013 in Japanese Application No. 2011-514660.
Chinese Official Action dated May 10, 2013 in Chinese Application No. 200980123542.5.
Mexican Official Action dated Mar. 26, 2013 in Mexican Application No. MX/a/2010/013575.
European Official Action dated Aug. 13, 2013 in European Application No. 09 767 235.6-1955.
Chinese Official Action dated Sep. 17, 2013 in Chinese Application No. 200980123542.5.

* cited by examiner

DISPLAYING A LIST OF FILE ATTACHMENTS ASSOCIATED WITH A MESSAGE THREAD

BACKGROUND

The development of reports, presentations, and other documents often involves collaboration between multiple, remote individuals within an organization or group. However, even in corporate environments that have access to collaboration software or other file sharing technologies, individuals often use email to collaborate, utilizing file attachments to share documents with each other or to distribute versions of documents for review and editing.

For example, one person may send an initial email message containing an attached document to several individuals in the organization. Each of these individuals may in turn revise the documents, often renaming the document in such a way to reflect that modifications have been made. The modified document may then be returned to the sender in a reply message, or forwarded to others in the organization. The messages sent back and forth in response to the initial message together make up a conversation or message thread. The message thread may eventually include several file attachments representing different versions of the original document, referred to herein as the root file.

Users accessing their emails through traditional email applications may be provided with a mechanism to view all the messages associated with a message thread, either in date order or in a hierarchical display indicating the flow of messages among the individuals involved in the message thread. The display of messages associated with the message thread may also provide an indication of the messages that include a file attachment.

However, there is currently no easy way to aggregate together all of the different file attachments that have been attached or modified by the individuals involved in the conversation or message thread. An email user typically accesses each message in the message thread that has an attachment manually in order to identify the root files associated with the message thread. Further, users typically determine manually the most recent version of each root file by reviewing the varying names and last modified dates of each file attachment related to the root file.

It is with respect to these considerations and others that the disclosure made herein is presented.

SUMMARY

Technologies are described herein for displaying a list of file attachments associated with a message thread in an email application. The messages associated with the message thread are identified, along with any file attachments attached to those messages. An aggregated attachment list is generated containing an entry for each file attachment associated with the message thread. The aggregated attachment list associated with the message thread is then displayed in a window of the email application.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
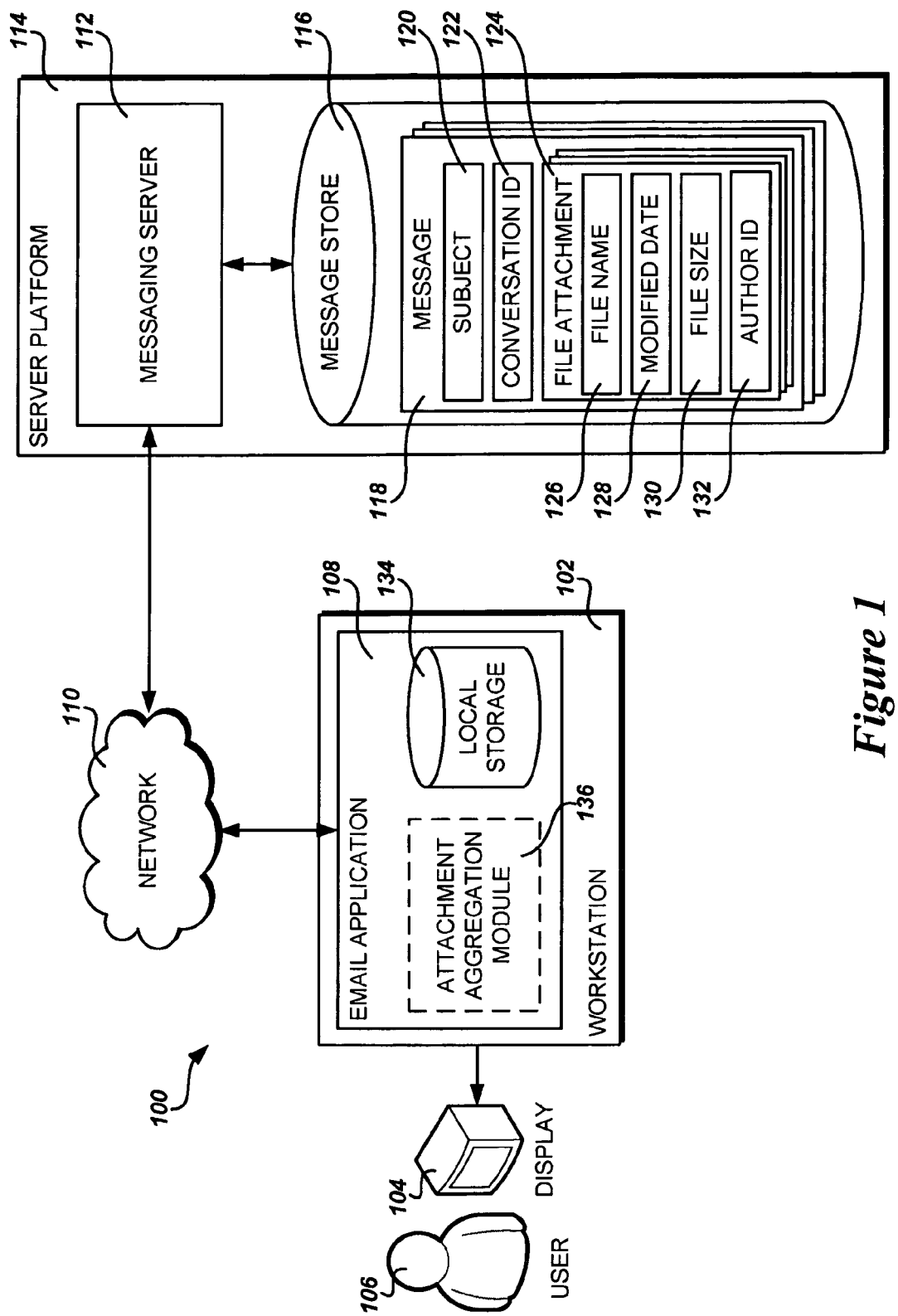
FIG. 1 is a block diagram showing aspects of illustrative operating environments and several software components provided by the embodiments presented herein.

The following detailed description is directed to technologies for displaying an aggregated attachment list in an email application that contains a list of file attachments associated with a message thread or conversation. The aggregated attachment list allows a user to view and interact with all the file attachments or root files associated with the message thread in a single location. By providing the aggregated attachment list, the user no longer needs to manually access each message in the message thread to identify the root files associated with the message thread. Nor will the user have to manually determine the most recent version of each root file by reviewing the varying names and last modified dates of each file attachment related to the root file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of a methodology for displaying a list of file attachments associated with a message thread will be presented.

Turning now to FIG. 1, details will be provided regarding an illustrative operating environment and several software components provided by the embodiments presented herein. FIG. 1 illustrates an exemplary system 100 for displaying an aggregated attachment list in an email application. The system 100 includes a workstation 102 that is connected to a display 104 allowing the workstation 102 to display a user interface (UI) to a user 106. It will be appreciated that the user 106 may interact with the workstation 102 through any number of input and output devices, such as a computer monitor, printer, keyboard, mouse, trackball, mouse pad, stylus, or touch-screen that may be directly connected to the workstation 102 or remotely connected via a network. It will be further appreciated that the workstation 102 illustrated in FIG. 1 may represent any computing device with which a user 106 may interact, including a desktop computer, notebook, laptop, tablet computer, ultra-mobile PC, server, or handheld device.

An email application 108 application executes on the workstation 102 that allows the user 106 to access and manage messages and other information. For example, the email application 108 may be a personal information manager (PIM) that provide access to email, voicemail, personal contacts, organizational contacts, calendar events, and other personal or business data and processes. In one embodiment, the email application 108 is the MICROSOFT®T OFFICE OUTLOOK® messaging and collaboration client from MICROSOFT CORPORATION of Redmond, Wash. It should be appreciated, however, that the embodiments presented herein may be utilized with email application programs from other vendors, including but not limited to, IBM® LOTUS NOTES® software from IBM CORP. of Armonk, N.Y., NOVELL® GROUPWISE® software from NOVELL, INC. of Waltham, Mass., or GMAIL™ from GOOGLE INC. of Mountain View, Calif.

The email application 108 is connected through a network 110 to a messaging server 112 executing on a remote server platform 114. The messaging server 112 provides messaging and other information services to the email application 108. In one embodiment, the messaging server 112 is the MICROSOFT® EXCHANGE SERVER messaging server from MICROSOFT CORPORATION. As will be appreciated by one skilled in the art, the messaging server 112 may be any messaging server known in the art capable of providing the messaging services described herein to the email application 108, such as IBM® LOTUS DOMINO® software from IBM CORP. or NOVELL® GROUPWISE® software from NOVELL, INC.

According to example embodiments, the network 110 comprises the Internet. However, it will appreciated that the network 110 may comprise a LAN, WAN, or other type of network suitable to allow the email application 108 located on the workstation 102 to communicate with the messaging server 112 executing on the server platform 114. It will be further appreciated that many more networks and network connections may be utilized than illustrated in FIG. 1.

The messaging server 112 may be connected to a message store 116. The message store 116 may store messages 118 and other data items for access by the email application 108. A message 118 may represent an email message, text message, fax, voice-mail, or any other communication. The message 118 may contain a subject 120. In example embodiments, the message 118 may also contain a conversation ID 122 that is used to group messages into conversations or message threads, as will be discussed in more detail below in regard to FIG. 4. According to further embodiments described herein, the message 118 may also include a number of file attachments 124. A file attachment 124 is a document or file attached to the message 118. The file attachment 124 may have a file name 126, a modified date 128 indicating the date the file was last modified, a file size 130 indicating the size of the file in bytes, and an author ID 132 indicating the author of the document or file. As will be appreciated by those skilled in the art, the message store 116 may be located on the server platform 114 or on a remote storage device accessible by the messaging server 112. The message store 116 may also contain other data items such as calendar events, contacts, tasks, notes, and other personal or business data beyond that illustrated in FIG. 1.

In further embodiments, the email application 108 may include a local storage 134 where the email application 108 caches data regarding messages 118 and other data items. A message 118 may be cached in the local storage 134 upon the first access of the message 118 by the email application 108, or all available messages 118 may be moved or copied from the message store 116 to the local storage 134 on a scheduled basis. For example, the email application 108 may access the messaging server 112 via the Post Office Protocol version 3 (POP3) protocol every hour to download the available messages 118 from the message store 116 and store them in the local storage 134. It will be appreciated that many other methods and protocols for retrieving messages from a messaging server and locally storing the messages may be utilized by the email application 108.

The email application 108 may also include an attachment aggregation module 136 that performs the operations of displaying the aggregated attachment list, which will be described in detail below. In example embodiments, the functionality of the attachment aggregation module 136 is provided by the email application 108. It will be appreciated, however, that the attachment aggregation module 136 may be provided as an add-in module for the email application 108. The add-in module may utilize an application programming interface (API) provided by the email application 108 to access the data from the messaging server 112 or the local storage 134 and to display the aggregated attachment list as part of the UI of the email application 108.

Figure 2:
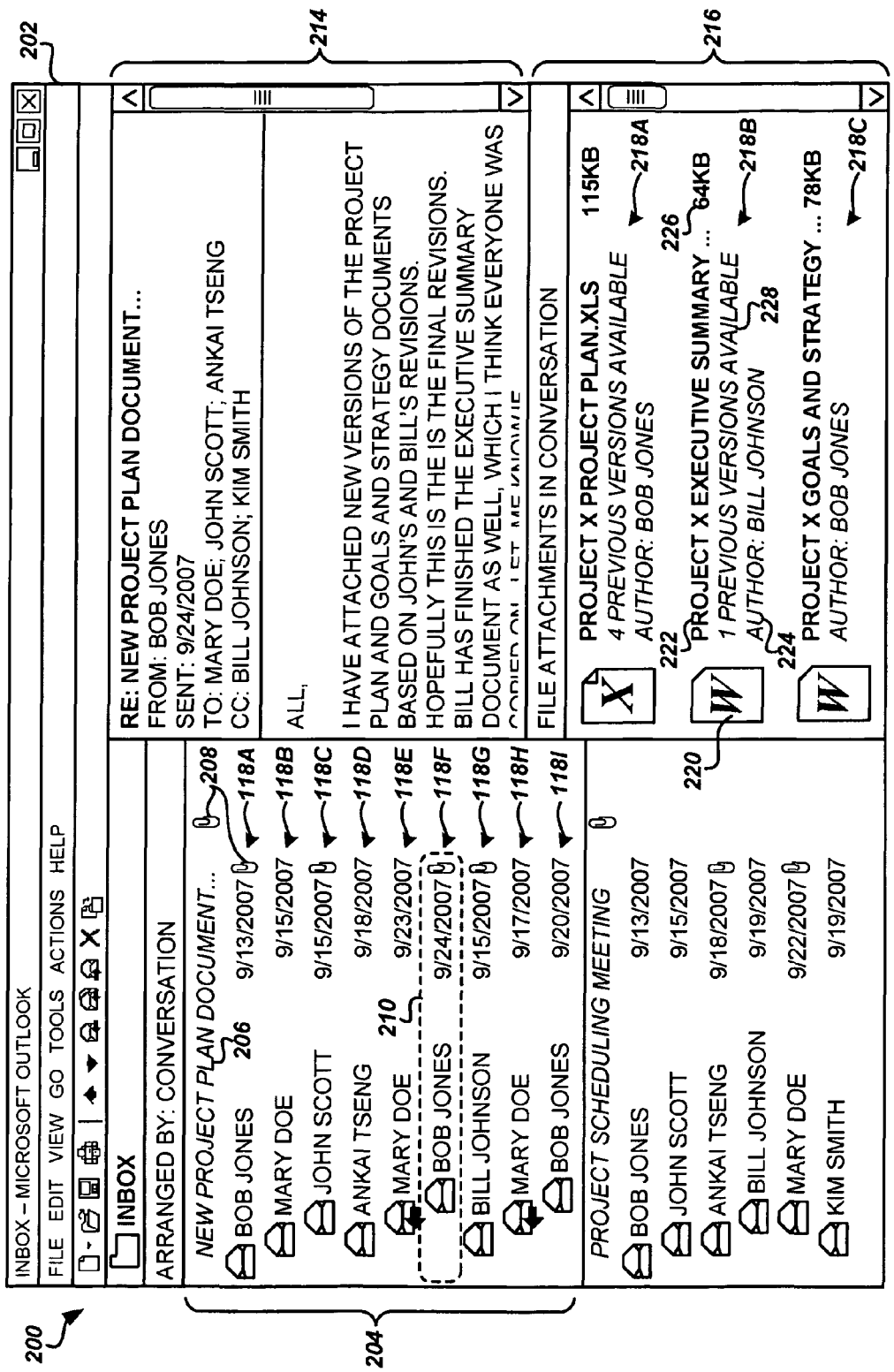
FIGS. 2-3 are screen diagrams showing exemplary user interfaces for displaying a list of file attachments associated with a message thread, according to embodiments described herein.
Figure 3:
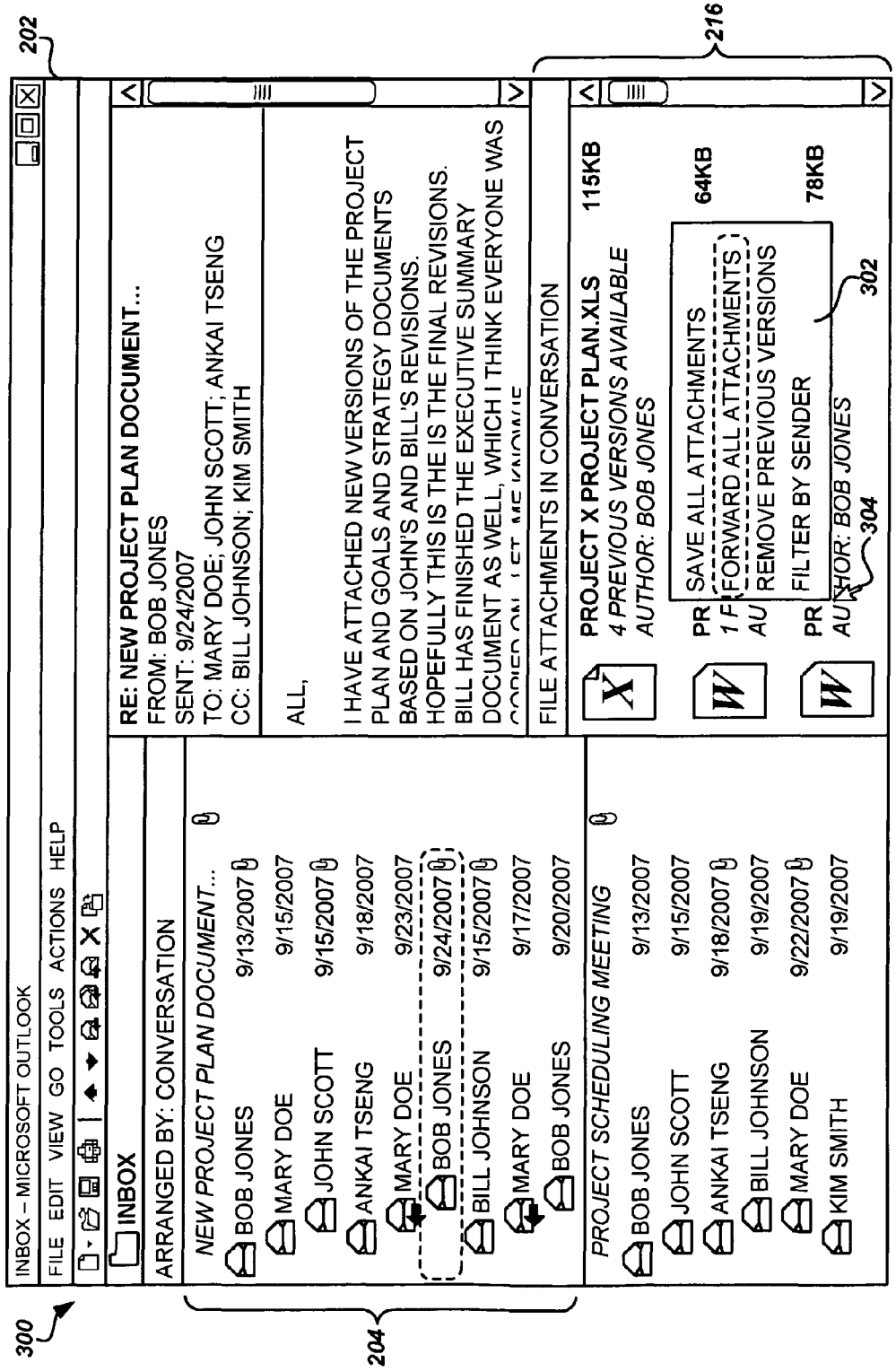

FIGS. 2-3 illustrate exemplary UIs that may be generated by the attachment aggregation module 136 and the email application 108 for displaying an aggregated attachment list associated with a message thread, according to embodiments. In particular, FIG. 2 illustrates a UI 200 generated by the attachment aggregation module 136 and email application 108 in conjunction with the display of data regarding a message 118 associated with a message thread. The UI 200 includes of a window 202 displayed by the email application 108 that contains a group of messages 118A-118I associated with a message thread 204 or conversation.

The messages 118A-118I associated with the particular message thread 204 may be identified based on a shared conversation ID 122, same or similar subjects 120, or some other method of determining the relationships among messages, as will be described in more detail below in regard to FIG. 4. For example, the message thread 204 illustrated in FIG. 2 contains several associated messages 118A-118I grouped under a heading 206 of "New Project Plan Document . . . " The presence of one or more file attachments 124 for a particular message 118A may be indicated by an attachment indicator 208 image or icon. Another attachment indicator 208 may be displayed next to the heading 206 of the message thread 204 to indicate that the message thread 204 includes at least one message 118A with a file attachment 124. When a particular message 118F is selected by the user 106 from the message thread 204, as indicated by the selection box 210 in FIG. 2, information regarding the selected message 118F is displayed by the email application 108 in a message detail pane 214 of the window 202.

According to embodiments presented herein, when the message detail pane 214 is displayed for a message 118F associated with a message thread 204 that includes at least one file attachment 124, the attachment aggregation module 136 displays an aggregated attachment list 216 in the window 202 in proximity to the message detail pane 214. In example embodiments, the aggregated attachment list 216 may contain list entries 218A-218C for the file attachments 124 attached to the messages 118A-118I associated with the message thread 204 of which the selected message 118F is a part. The list entries 218A-218C may contain a file-type icon 220 indicating the file type of the corresponding file attachment 124, the name 222 of the file, the author 224 of the file, and the size 226 of the file in bytes.

As described above, the file attachments 124 associated with the message thread may represent several different versions of a few, root files. In further embodiments, the aggregated attachment list 216 may contain list entries 218A-218C for any root file identified from the file attachments 124 associated with the message thread 204, as will be described in more detail below in regard to FIG. 5. The file-type icon 220, name 222, author 224, and file size 226 displayed for the list entries 218A-218C represents the latest version of the corresponding root file. In addition, list entries 218A-218B for corresponding root files having multiple versions identified in the file attachments 124 may also include an indication of the number of versions 228 of the root file represented in the file attachments 124.

The latest version of a root file and the number of versions available may be determined by the attachment aggregation module 136, as will be described below in regard to FIG. 5. The number of versions 228 may be displayed as a hyperlink that allows the user 106 to access the various versions of the root file when the user 106 selects the hyperlink using a mouse, for example. It should be appreciated that, although the use of a mouse is described in the examples presented herein, any suitable user input devices may be utilized to allow users to select or interact with UI controls, including, but not limited to, a keyboard, trackball, mouse pad, stylus, or touch-screen that may be connected to the workstation 102.

According to example embodiments, the attachment aggregation module 136 may provide the same UI functionality for the various list entries 218A-218C displayed in the aggregated attachment list 216 as provided for any other representation of a file in the email application 108. For example, a list entry 218B may be selected by a user 106 with a mouse, dragged from the aggregated attachment list 216, and dropped into a file folder or other file location presented in the UI. If a list entry 218B is dragged from the aggregated attachment list 216 and dropped into a file location, the latest version of the root file corresponding to the list entry 218B may be copied to the file location.

The attachment aggregation module 136 also provides for files to be dragged and dropped into the aggregated attachment list 216 through the UI. If a file is dropped into the aggregated attachment list 216 from another location, the attachment aggregation module 136 may create a new message 118 associated with the message thread 204, attach the file as a file attachment 124, and store the message 118 in the message store 116 or the local storage 134. Additionally, the attachment aggregation module 136 may forward the message 118 to some or all of the individual senders and recipients of messages 118A-118I associated with the message thread 204.

In another embodiment, the attachment aggregation module 136 may provide further functionality for managing the root files or file attachments 124 corresponding to the list entries 218A-218C displayed in the aggregated attachment list 216. As illustrated in the UI 300 depicted in FIG. 3, this additional functionality may be accessed from a context menu 302 displayed by the attachment aggregation module 136 when a user 106 hovers a mouse cursor 304 over the aggregated attachment list 216 and clicks the right mouse button, for example. The context menu 302 may contain menu items that allow the user 106 to perform actions on the entire group of attachments, such as:

"Save All Attachments" that would save all file attachments or root files associated with the message thread 204 to a single location;

"Forward All Attachments" that would allow the user 106 to create a new message 118 with all of the root files attached;

"Remove Previous Versions" that removes all versions of all root files except for the latest version of each from the message store 116 or local storage 134; and "Filter by Sender" that allows the user to view just the file attachments 124 from an individual sender.

It will be appreciated that the context menu 302 may contain other menu items that allow the user 106 to act upon all file attachments 124 or an individual file attachment 124 or root file associated with the message thread 204.

While the aggregated attachment list 216 is illustrated in FIGS. 2-3 as being displayed in conjunction with the data regarding a message 118F selected from a message thread 204, it will be appreciated that the attachment aggregation module 136 may generate an aggregated attachment list 216 in conjunction with the display of any message in the message store 116 that is associated with a message thread 204, regardless of the context of its selection. Further, many variations in the location of the aggregated attachment list 216 in the window 202 and the layout of the file-type icon 220, name 222, author 224, file size 226, and number of versions 228 displayed in the aggregated attachment list 216 will be apparent to those of ordinary skill in the art, and this application is intended to cover any such variations beyond those illustrated in FIGS. 2-3.

Figure 4:
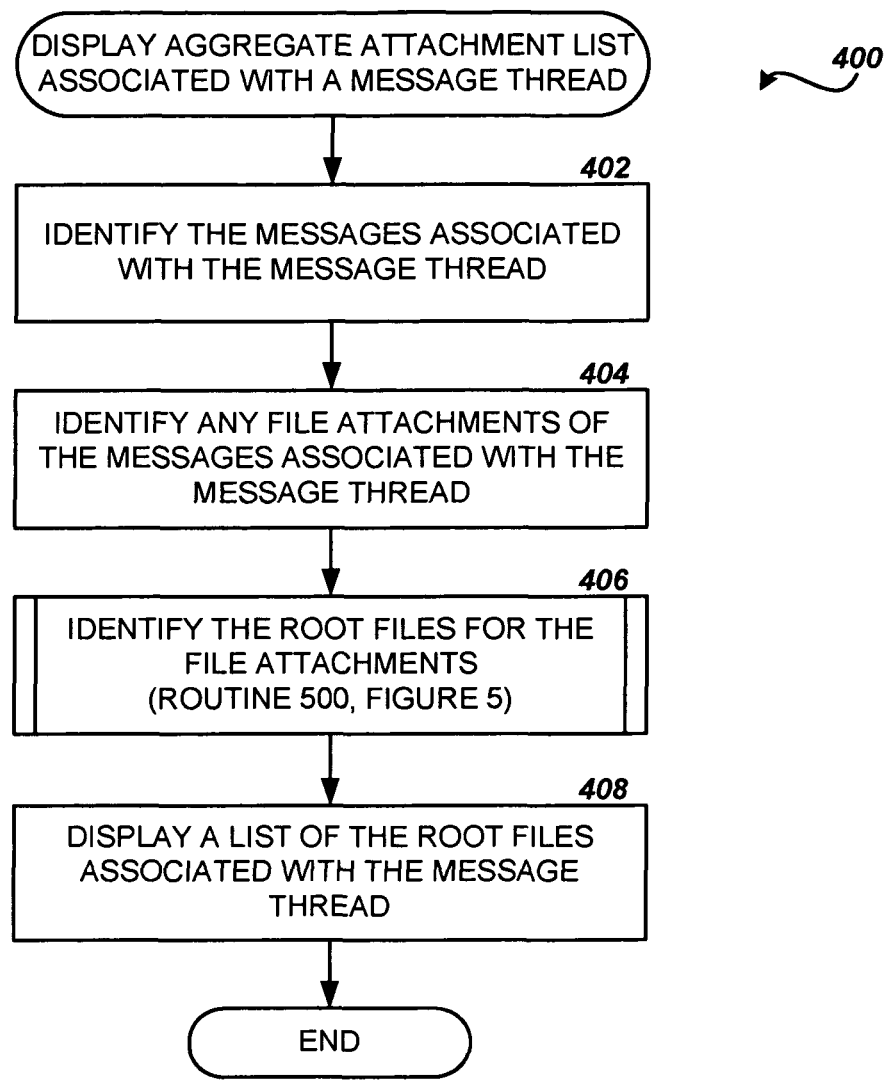
FIG. 4 is a flow diagram showing methods for displaying a list of file attachments associated with a message thread, as provided in the embodiments described herein.
Figure 5:
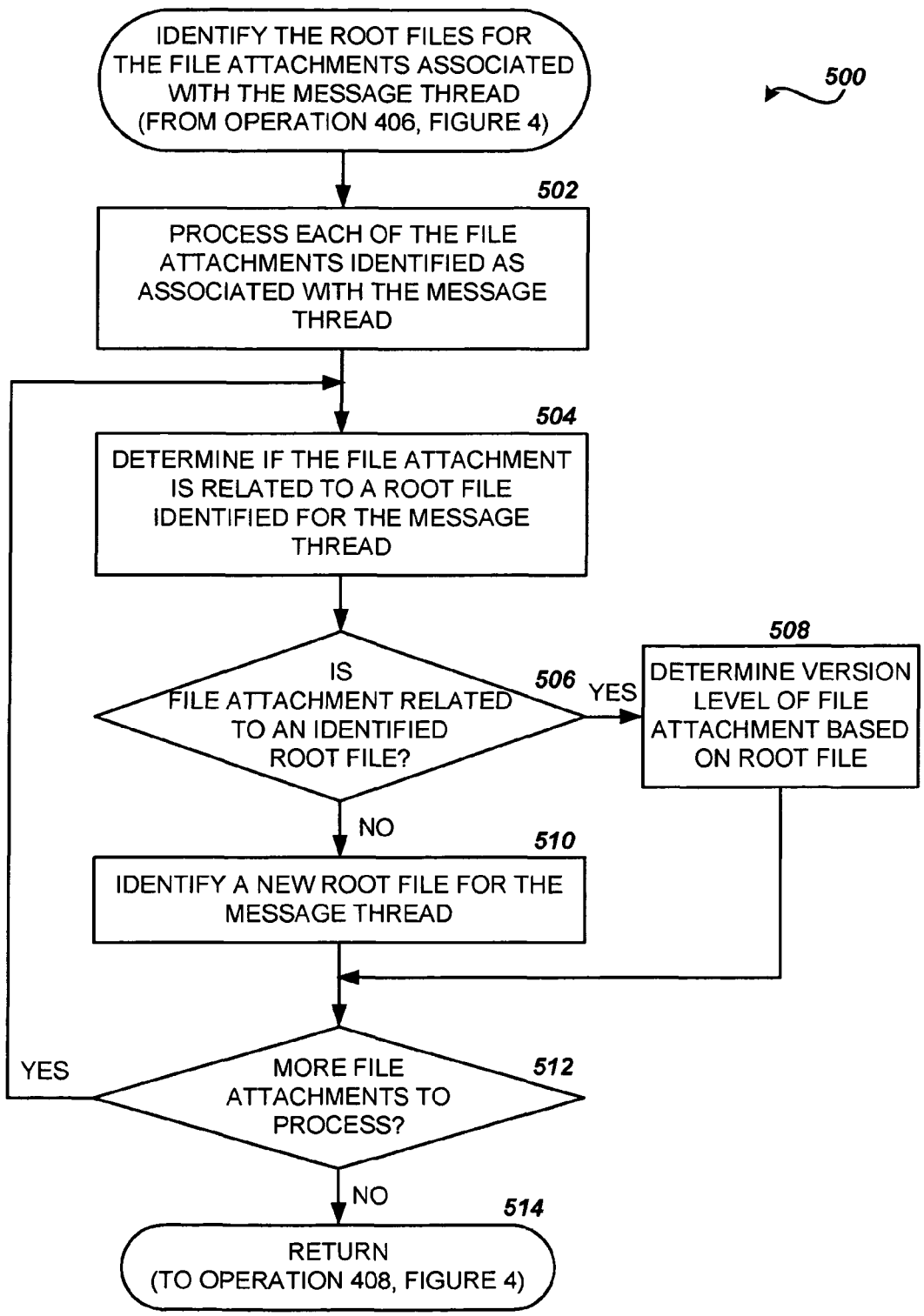
FIG. 5 is a flow diagram showing methods for identifying the root files related to the file attachments associated with a message thread, as provided in the embodiments described herein.

Referring now to FIGS. 4-5, additional details will be provided regarding the embodiments presented herein. In particular, FIG. 4 illustrates routines, denoted generally at 400, for displaying an aggregated attachment list associated with a message thread. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

The routines 400 begin at operation 402, where the attachment aggregation module 136 identifies the messages 118A-118I associated with the current message thread 204. As described above, this may be done by identifying all messages 118 in the message store 116 or local storage 134 that share a common conversation ID 122, according to example embodiments. The conversation ID 122 may be a globally unique identifier (GUID) or a string that identifies a conversation or message thread to which the message 118 is associated. The conversation ID may be generated for the first message 118A in a message thread. Subsequent messages 118B-118I in the message thread 204, such as replies or forwarded messages, may have the same conversation ID 122 as the original message 118A. This allows subsequent messages 118B-118I to retain their association with the message thread 204, even if other data regarding the message 118, such as the subject 120, is changed.

In further embodiments, the attachment aggregation module 136 may utilize the subject 120 of a given message to determine the messages 118A-118I associated with the message thread 204. In example email applications 108, when a user 106 replies to or forwards a message 118A, the subsequent message 118B-118I may retain the same subject 120 as the original message 118A, except for a prefix, such as "Re:" or "FW:," appended to the subject 120 to indicate the action taken by the user 106 upon the previous message. In determining the messages 118A-118I associated with the message thread 204, the attachment aggregation module 136 may identify all messages 118 in the message store 116 or local storage 134 that share a similar subject 120, ignoring any prefixes in the subject 120. It will be appreciated that other methods of identifying messages associated with a message thread may be used by the attachment aggregation module 136 in operation 402.

From operation 402, the routines proceed to operation 404, where the attachment aggregation module 136 identifies any file attachments 124 of the messages 118A-118I associated with the message thread 204. The attachment aggregation module 136 may access the messages 118A-118I identified in operation 402 to determine the file attachments 124 associated with the message thread 204. Once the file attachments 124 associated with the message thread 204 have been identified, the routines 400 may proceed from operation 404 to operation 406, where the attachment aggregation module 136 identifies the root files for the file attachments 124, as will be described in more detail below in regard to FIG. 5.

The routines 400 then proceed from operation 406 to operation 408 where the attachment aggregation module 136 displays the aggregated attachment list 216 in the window 202 of the email application 108. A list entry 218A-218C may be created in the aggregated attachment list 216 for the root files associated with the message thread 204, as identified by the attachment aggregation module 136 in operation 406. The attachment aggregation module 136 uses the file name 126, file size 130 and author ID 132 retrieved from the file attachment 124 determined to be the latest version of the corresponding root file to render the file-type icon 220, name 222, author 224, and file size 226 for the list entries 218A-218C in the aggregated attachment list 216. In addition, the number of versions 228 of each root file determined in operation 406 is displayed in the corresponding list entry 218A-218C.

FIG. 5 illustrates routines, denoted generally at 500, that provide further aspects of the operation 406 described above for identifying the root files associated with the message thread 204 from the file attachments 124. The routines 500 begin at operation 502 where the attachment aggregation module 136 accesses the file attachments 124 identified in operation 404 above as being associated with the message thread 204. For a given file attachment, the routines 500 proceed to operation 504 where the attachment aggregation module 136 determines if the file attachment 124 is related to a root file already identified for the message thread 204.

According to example embodiments, the attachment aggregation module 136 may use the file name 126 of the file attachments 124 to determine if two file attachments 124 are related to the same root file or document. If the file names 126 of two file attachments 124 are the same, then the attachment aggregation module 136 may determine that the file attachments 124 are related to the same root file.

However, when a user 106 replies to or forwards a message 118 containing a modified file attachment 124, the user 106 may rename the file attachment 124 to indicate that the document or file has been revised. For example, a user may receive a message 118A with a file attachment named "Project X Project Plan.xls." The user then subsequently modifies the document attached to the message 118A, and replies with a new message 118G attaching the modified document as a file attachment 124 with the name "Project X Project Plan (BillJ revisions 9-15).xls." In order to determine that the file attachments 124 attached to the two messages 118A, 118G are versions of the same root file, the attachment aggregation module 136 may analyze the file name 126 of each file attachment 124 by applying common syntactical rules or methods for such renaming of files. It will be appreciated that many methods of syntactical logic may be applied to determine file attachments related to the same root file and versioning of root files based on the file names.

In further embodiments, the attachment aggregation module 136 may use other attributes of the file attachments 124 to determine if they are related to the same root file, such as a document title or a description extracted from the contents of the file attachment 124. It will be appreciated that many other methods may be employed by the attachment aggregation module 136 to compare the file attachments, including a comparison of the contents of the file attachments.

At operation 506, if the attachment aggregation module 136 determines that the file attachment 124 is related to an already identified root file, then the routines 500 may proceed to operation 508. In operation 508, the attachment aggregation module 136 may determine the version level of the file attachment 124, based on a comparison with the identified root file. By determining a version level of each file attachment 124 related to the same root file, the attachment aggregation module 136 may determine the file attachment 124 that represents the latest version of the root file, as well as the number of versions of the root file available for display in the aggregated attachment list 216. In example embodiments, the attachment aggregation module 136 may determine the version levels of the file attachments related to the same root file by comparing the last modified date 128 of the file attachments 124.

If, at operation 506, the attachment aggregation module 136 determines that the file attachment 124 is not related to an already identified root file, the routines 500 may proceed to operation 510, where a new root file is identified for the message thread 204 from the file attachment 124. Next, at operation 512, if there are more file attachments to be processed, the routines 500 may return to operation 504, where the attachment aggregation module 136 repeats the routine 500 for the next file attachment 124. If no more file attachments 124 are left to process, the routines 500 may proceed from operation 512 to operation 514 where the routine 500 ends.

Figure 6:
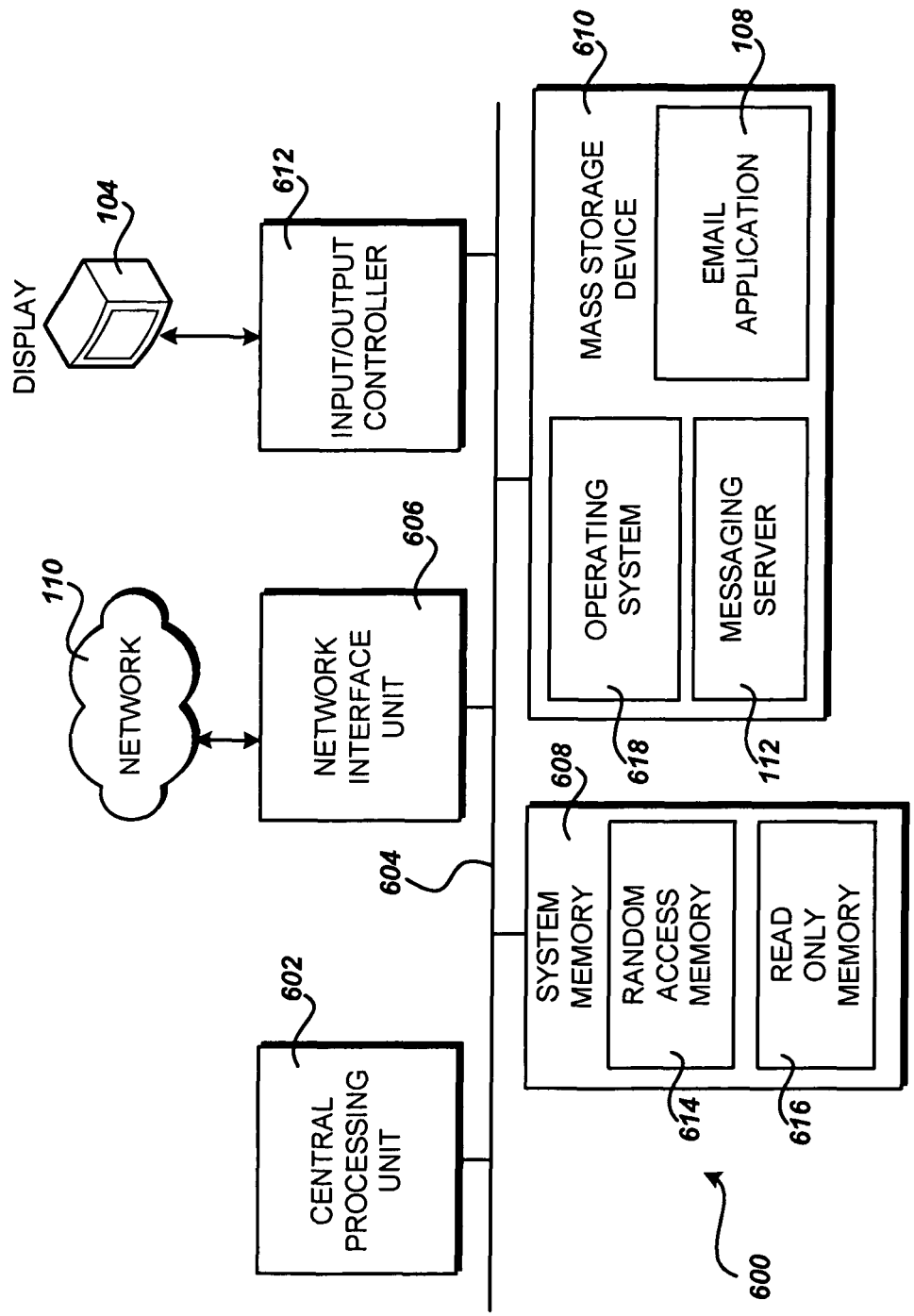
FIG. 6 is a block diagram showing illustrative computer hardware and software architectures for a computing system capable of implementing aspects of the embodiments presented herein.

FIG. 6 shows illustrates example computer architectures for computers 600 capable of executing the software components described herein for displaying a list of file attachments associated with a message thread in the manner presented above. The computer architecture shown in FIG. 6 illustrates a conventional desktop, laptop, or server computer and may be utilized to execute any aspects of the software components presented herein described as executing on the workstation 102 or server platform 114.

The computer architecture shown in FIG. 6 includes a central processing unit 602 (CPU), a system memory 608, including a random access memory 614 (RAM) and a read-only memory 616 (ROM), and a system bus 604 that couples the memory to the CPU 602. A basic input/output system containing the basic routines that help to transfer information between elements within the computer 600, such as during startup, is stored in the ROM 616. The computer 600 also includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 600.

According to various embodiments, the computer 600 may operate in a networked environment using logical connections to remote computers through a network such as the network 110. The computer 600 may connect to the network 110 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display 104, a printer, or other type of output device.

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the email application 108 or the messaging server 112, each of which was described in detail above in regard to FIG. 1. The mass storage device 610 and the RAM 614 may also store other types of program modules or data.

Based on the foregoing, it should be appreciated that technologies for displaying a list of file attachments associated with a message thread in an email application are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for displaying an aggregated attachment list associated with a message thread in an email application, the method comprising:
   identifying one or more messages associated with the message thread by identifying messages having a same conversation ID;
   identifying one or more file attachments attached to the one or more messages;
   identifying respective root files related to the one or more file attachments by comparing contents of the one or more file attachments with the contents of the respective root files, wherein identifying respective root files related to the one or more file attachments comprises
      determining, for each of the one or more file attachments, if the file attachment is related to an identified root file associated with the message thread,
      upon determining that the file attachment is related to an identified root file associated with the message thread, determining a version level of the file attachment based on the identified root file, and
      upon determining that the file attachment is not related to an identified root file associated with the message thread, identifying a new root file for the message thread;
   generating the aggregated attachment list to include respective list entries for the one or more file attachments having associated version levels and the root files identified;
   displaying the aggregated attachment list in a window of the email application wherein the list entries respectively comprise a file-type icon, one or more of a file name, a file size, and an identification of an author of the one or more file attachments; and
   displaying a user interface control in conjunction with the aggregated attachment list which, when selected, will cause all versions of all root files to be removed except for file attachments having a greatest version level of the corresponding root file.

2. The method of claim 1, wherein identifying the one or more messages associated with the message thread further comprises identifying one or more messages having a same or similar subject.

3. The method of claim 1 wherein the list entries respectively further comprise an indication of a number of file attachments related to the root files.

4. The method of claim 1, wherein identifying the respective root files related to the one or more file attachments further comprises identifying file attachments having a same or similar file name as related to one root file.

5. The method of claim 1, wherein determining respective version levels for the one or more file attachments based upon the root file related to the file attachment comprises comparing a respective modified date for the one or more file attachments related to the root file.

6. The method of claim 1, wherein the list entries respectively further comprise an indication of the file attachment having the greatest version level.

7. A computer readable storage medium that is not a signal, having computer executable instructions stored thereon that, when executed by a computer, cause the computer to:
  identify one or more messages associated with a message thread by identifying messages having a same conversation ID;
  identify one or more file attachments attached to the one or more messages;
  identify respective root files related to the one or more file attachments by comparing contents of the one or more file attachments with the contents of the respective root files, wherein identifying respective root files related to the one or more file attachments comprises
    determining, for each of the one or more file attachments, if the file attachment is related to an identified root file associated with the message thread,
    upon determining that the file attachment is related to an identified root file associated with the message thread, determining a version level of the file attachment based on the identified root file, and
    upon determining that the file attachment is not related to an identified root file associated with the message thread, identifying a new root file for the message thread;
  generate an aggregated attachment list comprising respective list entries for the one or more file attachments having associated version levels and the root files identified;
  display the aggregated attachment list in a window of an email application wherein the list entries respectively comprise a file-type icon, one or more of a file name, a file size, and an identification of an author of the one or more file attachments; and
  display a user interface control in conjunction with the aggregated attachment list which, when selected, will cause all versions of all root files to be removed except for file attachments having a greatest version level of the corresponding root file.

8. The computer readable storage medium of claim 7, wherein identifying the one or more messages associated with the message thread further comprises identifying one or more messages having a same or similar subject.

9. The computer readable storage medium of claim 7, wherein identifying the respective root files related to the one or more file attachments further comprises identifying file attachments having a same or similar file name as related to one root file.

10. The computer readable storage medium of claim 7, wherein determining respective version levels for the one or more file attachments based upon the root file related to the file attachment comprises comparing a respective modified date for the one or more file attachments related to the root file.

11. The computer readable storage medium of claim 7, wherein the list entries respectively further comprise an indication of the file attachment having the greatest version level.

12. A system for displaying an aggregated attachment list comprising:
  a message store containing a plurality of messages associated with a message thread;
  an email application configured to execute on a workstation and operable to access the message store and display a window comprising information regarding the plurality of messages; and
  an attachment aggregation module configured to execute within the email application and operable to:
    identify the plurality of messages associated with the message thread by identifying messages in the message store having a same conversation ID,
    identify one or more file attachments attached to the plurality of messages,
    identify respective root files related to the one or more file attachments by comparing contents of the one or more file attachments with the contents of the respective root files, wherein identifying respective root files related to the one or more file attachments comprises
      determining, for each of the one or more file attachments, if the file attachment is related to an identified root file associated with the message thread,
      upon determining that the file attachment is related to an identified root file associated with the message thread, determining a version level of the file attachment based on the identified root file, and
      upon determining that the file attachment is not related to an identified root file associated with the message thread, identifying a new root file for the message thread,
    generate the aggregated attachment list to include respective list entries for the one or more file attachments having associated version levels and the root files identified,
    display the aggregated attachment list in the window of the email application, wherein the list entries respectively comprise a file-type icon, one or more of a file name, a file size, and an identification of an author for the one or more file attachments, and
    display a user interface control in conjunction with the aggregated attachment list which, when selected, will cause all versions of all root files to be removed except for file attachments having a greatest version level of the corresponding root file.

13. The system of claim 12, wherein identifying the respective root files related to the one or more file attachments further comprises identifying file attachments having a same or similar file name as being related to a same root file.

14. The system of claim 12, wherein the message store is stored locally on the workstation.

15. The system of claim 12, wherein the message store is stored on a server computer remote from the workstation.

* * * * *